C. G. BUSH.

Keleidoscopes.

No. 5,649. Reissued Nov. 11, 1873.

Attest

M. Gardner.

H. W. Thrickmorton

Inventor

Charles G. Bush by his Attorney.

John J. Halsted.

AM. PHOTO-LITHOGRAPHIC Co. N.Y. (OSBORNE'S PROCESS)

UNITED STATES PATENT OFFICE.

CHARLES G. BUSH, OF BOSTON, MASSACHUSETTS, ASSIGNOR TO HIMSELF AND JOHN W. HOARD.

IMPROVEMENT IN KALEIDOSCOPES.

Specification forming part of Letters Patent No. 143,271, dated September 30, 1873; reissue No. 5,649, dated November 11, 1873; application filed October 30, 1873.

*To all whom it may concern:*

Be it known that I, CHARLES G. BUSH, of Boston, in the county of Suffolk and State of Massachusetts, have invented a new and useful Improved Object for the Object-Box of Kaleidoscopes; and I do hereby declare the same to be fully described in the following specification and represented in the accompanying drawings, of which—

Figure 1:
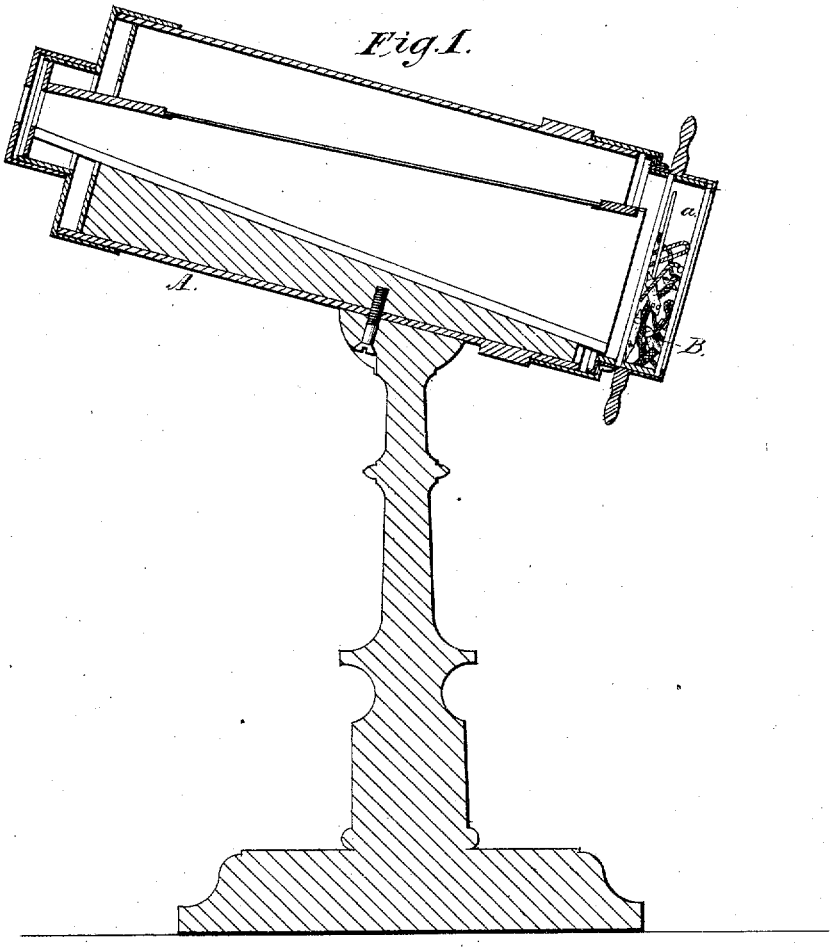
Figure 2:
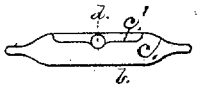
Figure 3:
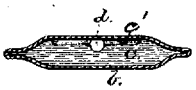

Figure 1 is a vertical and longitudinal section of a kaleidoscope as invented by me. Fig. 2 is a side view, and Fig. 3 is a longitudinal section, of one of its novel objects designed to be used in the object-box.

Heretofore, in the manufacture of kaleidoscopes, some of the objects used in the rotary object chamber or box in front of the reflectors have been solid bodies of various colors or forms, and such may be used with my invention.

This invention consists: First, in an object for use in the object-box of a kaleidoscope, made of a glass tube having its end or ends closed by heating, fire-heating, or otherwise, without the use of cement or of any foreign plugging material. Second, in a glass tube hermetically sealed, and containing two or more liquids of different densities and colors. Third, in a glass tube hermetically sealed, and containing a liquid and also one or more solid articles.

In carrying out my said invention, I make, for use in the object-box, a glass vessel or tube, *b*, hermetically sealed by fire-heating or otherwise, so as to avoid the use of cement or any foreign material for plugging or closing the tube at the end.

The advantage of sealing the end by means of the same material of which the tube is composed avoids any liability or risk of accidental opening of the end by the loosening, breaking, or crumbling away of the plugging or cementing material, and to which an article of this kind is peculiarly subject, because when in use it is constantly tossed and jolted against other objects. The effect of such unsealing would be serious, inasmuch as it would allow any liquid contained in the tube to be discharged from it, thus depriving it of its great source of beauty, and also causing the other objects in the box to become smeared, and to cling together and collect dust, and, further, causing the liquid or oil to be spattered upon the glass heads of the box, and, in a measure, destroy their clearness and transparency.

The glass-sealed part in my invention is, on the contrary, the strongest, and nothing can impair it short of a breaking of the tube.

To produce exquisitely-beautiful effects in the kaleidoscope, I place within a hermetically-sealed tube one or more liquids of different densities, which will not intermix, or one or more solids; the purpose being to produce one or more new and useful effects—viz., the movement or movements within the tube, through the action of gravity of the air, liquid, or solid in the main liquid, and this in addition to the movement of the sealed tube itself relatively to the other objects in the box—and also to obtain better or more brilliant colors than can usually be obtained by the use of colored solids, such as are ordinarily employed, as my tubes or vessels can hold chemically-colored solutions.

In the rotation of the object-box, my compound tube, like any other object therein, is caused by gravity to fall into different positions.

A hollow glass object with two immiscible liquids and an air-bubble contained therein is shown in Figs. 2 and 3, in which *b* is the vessel hermetically sealed, *c* and *c'* the two immiscible liquids, and *d* the air-bubble, the whole resembling a diminutive glass spirit-level.

I would remark that a glass tube, containing a single liquid and an air-bubble, the ends of the tube being closed by cement or plugging, is an object heretofore used by me, and not claimed in this application; and in carrying out my invention, in regard to the contents of the tube, I employ either two or more liquids of different densities or character, or a liquid with a solid or solids. I thus obtain two liquids or objects of different colors within the same vessel or tube, and which, by their relative movements within such tube, produce new and pleasing effects.

What I claim, therefore, as new in objects for the object-box of kaleidoscopes, is as follows:

1. In combination with a kaleidoscope-box, a glass tube or vessel for containing one or more objects, said tube or vessel being closed hermetically without the use of cement or plugging.

2. In combination with a kaleidoscope-box, an object, consisting of a glass tube or vessel containing liquid, and closed hermetically by the fusing of the glass without the aid of cement or plugging.

3. An object for kaleidoscopes, consisting of a glass tube or vessel containing two or more immiscible liquids, or one or more liquids and one or more solids.

CHARLES G. BUSH.

Witnesses:
JOHN C. PURKIS,
THOS. A. MILLETT.